1759X
Z. Phinney,
Washing-Machine Pounder,
Patented June 19, 1812.
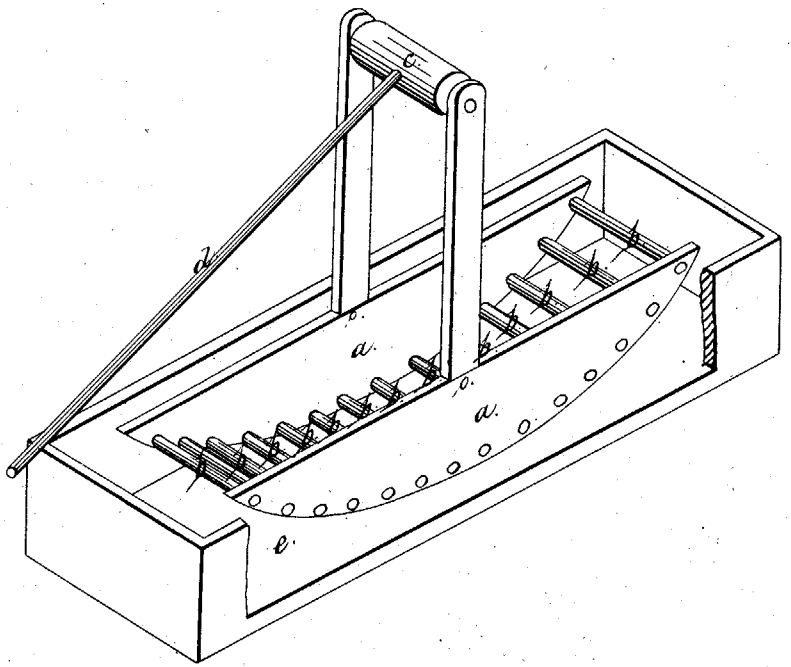
N. PETERS, PHOTO-LITHOGRAPHER, WASHINGTON, D. C.

Zina Phinney
Letters Patent

1759X

The Schedule referred to in these Letters Patent and making part of the same containing a description in the words of the said Zina Phinney himself of his Washing and Churning Machine:

1st. Any kind of Rockers with any kind of slats or rounds, or with slats or cogs to work either in a circular trough or a flat bottomed box (which Box may be a convenient Wash Tub, when the rockers are not set in.

2nd. On each Rocker is fastened a perpendicular piece of Board or Plank on which a weight is placed at such a distance from the rocker as would be the centre of the circumference of the Rocker continued to a circle, through which boards at the centre passes a gudgeon or pin into a roller (which constitutes the weight) this to be played in a round or flat bottomed box by a handle in the centre of the Roller or weight. or with arms on each side of the Box in order to fix a purchase from a roller at the top. the arms from the Rollers to be extended to pins between the roller or weight and th.e Rockers. These rockers may be placed in a circular bottomed trough or Box by the merely making the rockers more crooked and playing the same way as above mentioned.

Those rockers will be applied to the breaking of flax or hemp with suitable slats to mesh in with other slats set in a frame below to be worked by means of a Horse or by water with the addition of a crank similar to a saw mill crank. It also may be applied and used as a Churn Zina Phinney Exd Witnesses
William Thornton
Geo Lyon (300 words)

(Patented June 19. 1812)